US006795565B2

(12) United States Patent
Wendt

(10) Patent No.: US 6,795,565 B2
(45) Date of Patent: Sep. 21, 2004

(54) METHOD TO DETECT WATERMARK RESISTANT TO RESIZING AND TRANSLATION

(75) Inventor: Peter David Wendt, Mahwah, NJ (US)

(73) Assignees: Sony Corporation (JP); Sony Electronics Inc., Park Ridge, NJ (US)

( * ) Notice: Subject to any disclaimer, the term of this patent is extended or adjusted under 35 U.S.C. 154(b) by 583 days.

(21) Appl. No.: 09/802,244

(22) Filed: Mar. 8, 2001

(65) Prior Publication Data

US 2002/0126870 A1 Sep. 12, 2002

(51) Int. Cl.[7] .................................................. G06K 9/00
(52) U.S. Cl. .................... 382/100; 382/232; 382/288; 380/54; 713/176
(58) Field of Search ............................ 382/100, 232, 382/291, 288, 286, 293, 295; 380/210, 287, 54; 213/176; 348/461, 463, 465, 466; 713/176

(56) References Cited

U.S. PATENT DOCUMENTS

| 6,047,374 | A | | 4/2000 | Barton | |
|---|---|---|---|---|---|
| 6,108,434 | A | | 8/2000 | Cox et al. | |
| 6,282,300 | B1 | | 8/2001 | Bloom et al. | |
| 6,404,926 | B1 | * | 6/2002 | Miyahara et al. | 382/232 |
| 6,424,725 | B1 | | 7/2002 | Rhoads et al. | |
| 6,463,162 | B1 | * | 10/2002 | Vora | 382/100 |
| 6,556,689 | B1 | * | 4/2003 | Xia et al. | 382/100 |
| 6,563,937 | B1 | | 5/2003 | Wendt | |
| 2001/0036292 | A1 | * | 11/2001 | Levy et al. | 382/100 |
| 2002/0032698 | A1 | * | 3/2002 | Cox | 707/501.1 |
| 2002/0090107 | A1 | * | 7/2002 | Acharya et al. | 382/100 |
| 2003/0012402 | A1 | * | 1/2003 | Ono | 382/100 |
| 2003/0021439 | A1 | * | 1/2003 | Lubin et al. | 382/100 |
| 2003/0215112 | A1 | * | 11/2003 | Rhoads et al. | 382/100 |
| 2003/0219144 | A1 | * | 11/2003 | Rhoads et al. | 382/100 |

FOREIGN PATENT DOCUMENTS

JP    2001-078010    3/2001

OTHER PUBLICATIONS

M. Kutter, Watermaking Resisting to Translation, rotation, and scaling, Signal Processing Laboratory, Swiss Federal Institute of Technology.
V. Solachidis and I. Pitas, "Circularly Symmetric Watermark Embedding in 2–D DFT Domain," IEEE Article, pp. 3469–3472, 1999.
V. Licks, R. Jordan, "On Digital Image Watermark Robust To Geometric Transformations," IEEE Article, pp. 690–693, 2000.
Zhicheng Ni, Eric Sung and Yun Q. Shi, "Enhancing Robustness of Digital Watermarking against Geometric Attack Based on Fractal Transform," IEEE Article, pp. 1033–1036, 2000.

(List continued on next page.)

*Primary Examiner*—Timothy M. Johnson
*Assistant Examiner*—Barry Choobin
(74) *Attorney, Agent, or Firm*—Lerner, David, Littenberg Krumholz & Mentlik, LLP

(57) ABSTRACT

A method of detecting a block-based watermark is provided. The method detects the location of the watermark within a frame of content data regardless of whether the watermark has been shifted or resized.

25 Claims, 15 Drawing Sheets

OTHER PUBLICATIONS

Masoud Alghoniemy and Ahmed H. Tewfik, "Image Watermarking By Moment Invariants," IEEE Article, pp. 73–76, 2000.

Anatasios Tefas and Ioannis Pitas, "Multi–Bit Image Watermarking Robust To Geometric Distortions," IEEE Article, pp. 710–713, 2000.

P. Termont, L. DeStrycker, J. Vandewege, M. Op de Beeck, J. Haitsma, T. Kalker, M. Maes and G. Depovere, "How To Achieve Robustness Against Scaling In A Real–Time Digital Watermarking System For Broadcsat Monitoring," IEEE Article, pp. 407–410, 2000.

Min–Suk Hong, Tae–Yun Chung, Kang–Seo Park and Sang–Hui Park, "A Private/Public Key Watermarking Technique Robust To Spatial Scaling," IEEE Article, pp. 102–103, 1999.

Nopporn Chotikakamthorn and Siriporn Pholsomboon, "Ring–shaped Digital Watermark for Rotated and Scaled Images Using Random–Phase Sinusoidal Function," IEEE Article, pp. 321–325, 2001.

Joseph J.K. O Ruanaidh and Thierry Pun, "Rotation, Scale and Translation Invariant Digital Image Watermarking," IEEE Article, pp. 536–539, 1997.

Ching–Yung Lin, Min Wu, Jeffrey A. Bloom, Ingemar J. Cox, Matt L. Miller and Yui Man Lui, "Rotation, Scale, and Translation Resilient Watermarking for Images," IEEE Article, pp. 767–782, 2001.

Sofia Tsekeridou, Nikos Nikolaidis, Nikos Sidiropoulos and Ioannis Pitas, "Copyright Protection of Still Images Using Self–Similar Chaotic Watermarks," IEEE Article, pp 411–414, 2000.

Chun–Shien Lu and Hong–Yuan Mark Liao, "Video Object–Based Watermarking: A Rotation and Flipping Resilient Scheme," IEEE Article, pp. 483–486, 2001.

Flipping Resilient Scheme, IEEE Article, pp. 483–486, 2001.

Shelby Pereira, Joseph J. K. O Ruanaidh, Frederic Deguillaume, Gabriela Csurka and Thierry Pun, "Template Based Recovery of Fourier–Based Watermarks Using Log–polar and Log–log Maps," IEEE Article, pp. 870–874, 1999.

Shelby Pereira and Thierry Pun, "Transform for Digital Image Watermarking,".

S. Tsekeridou and I. Pitas, "Wavelet–Based Self–Similar Watermarking For Still Images," IEEE Article, pp. I–220–I–223, 2000.

I. Mora–Jimenez and A. Navia–Vazquez, "A New Spread Spectrum Watermarking Method With Self–Synchronization Capabilities," IEEE Article, pp. 415–418, 2000.

Shelby Pereira and Thierry Pun, "Robust Template Matching for Affine Resistant Image Watermarks," IEEE Article, pp. 1123–1129, 2000.

Martin Kutter, "Towards Affine Invariant Image Watermarking Schemes," Swiss Federal Institute of Technology, Lausanne, pp. 1–27.

R. Caldelli, M. Barni, F. Bartolini and A. Piva, "Geometric–Invariant Robust Watermarking Through Constellation Matching In The Frequency Doman," IEEE Article, pp. 65–68, 2000.

I. Burak Ozer, Mahalingam Ramkumar and Ali N. Akansu, "A New Method For Detection Of Watermarks in Geometrically Distorted Images," IEEE Article, pp. 1963–1966, 2000.

D. Delannay and B. Macq, "Generalized 2–D Cyclic Patterns For Secret Watermark Generation," IEEE Article, pp. 77–79, 2000.

H.Z. Hel–Or, Y. Yitzhaki and Y. Hel–Or, "Geometric Hashing Techniques For Watermarking," IEEE Article, pp. 498–501, 2001.

Sviatoslav Voloshynovskiy, Frederic Deguillaume and Thierry Pun, "Multibit Digital Watermarking Robust Against Local Nonlinear Geometrical Distortions," IEEE Article, pp. 999–1002, 2001.

Ross J. Anderson and Fabien A.P. Petitcolas, "Information Hiding An Annotated Bibliography," Computer Laboratory, University of Cambridge, pp. 1–62.

M. Kutter, S.K. Bhattacharjee and T. Ebrahimi, "Towards Second Generation Watermarking Schemes," IEEE Article, pp. 320–323, 1999.

N. Kaewkamnerd and K.R. Rao, "Wavelet Based Watermarking Detection Using Multiresolution Image Registration," IEEE Article, pp. II–171–II–175, 2000.

P. Termont, L. DeStrycker, J. Vandewege, J. Haitsma, T. Kalker, M. Maes, G. Depovere, A. Langell, C. Alm, P. Norman, "Performance Measurements of a Real–time Digital Watermarking System for Broadcast Monitoring," IEEE Article, pp. 220–224, 1999.

Maurice Maes, Ton Kalker, Jaap Haitsma and Geert Depovere, "Exploiting Shift Invariance to Obtain a High Payload in Digital Image Watermarking," IEEE Article, pp. 7–12, 1999.

Jean–Paul Linnartz, Ton Kalker and Jaap Haitsma, "Detecting Electronic Watermarks In Digital Video," Philips Researchpp. 1–4.

Fabien A.P. Petitcolas, Ross J. Anderson and Markus G. Kuhn, "Information Hiding—A Survey," IEEE Article, pp. 1062–1078, 1999.

Alghoniemy et al., "Geometric Distortion Correction Through Image Normalization," Proc. IEEE Int. Conf. on Multimedia and Expo 2000, vol. 3. Jul./Aug. 2000, pp. 1291–1294.

Kusanagi et al., "An Image Correction Scheme for Video Watermarking Extraction," IEICE Trans. Fundamentals, vol. E84–A, No. 1, Jan. 2001, pp. 273–280.

Delannay et al., "Compensation of Geometrical Deformations for Watermark Extraction in the Digital Cimema Application," Proc. SPIE vol. 4314: Security and Watermarking of Multimedia Contents III, Jan. 2001, pp. 149–157.

Su et al., "Synchronized Detection of the Block–based Watermark with Invisible Grid Embedding," Proc. SPIE vol. 4314: Security and Watermarking of Multimedia Contents III, Jan. 2001, pp. 406–417.

Loo et al., "Motion estimation based registration of geometrically distorted images for watermark recovery," Proc. SPIE vol. 4314: Security and Watermarking of Multimedia Contents III, Jan. 2001, pp. 606–617.

Su et al., "A Content–Dependent Spatially Localized Video Watermark for Resistance to Collusion and Interpolation Attacks," IEEE Proc. Int. Conf. on Image Processing, vol. 1, Oct. 2001, pp. 818–821.

\* cited by examiner

10

$$
\begin{array}{cccc|cccc}
1 & 1 & 1 & 1 & -1 & -1 & -1 & -1 \\
1 & 1 & 1 & 1 & -1 & -1 & -1 & -1 \\
1 & 1 & 1 & 1 & -1 & -1 & -1 & -1 \\
1 & 1 & 1 & 1 & -1 & -1 & -1 & -1 \\
\hline
-1 & -1 & -1 & -1 & 1 & 1 & 1 & 1 \\
-1 & -1 & -1 & -1 & 1 & 1 & 1 & 1 \\
-1 & -1 & -1 & -1 & 1 & 1 & 1 & 1 \\
-1 & -1 & -1 & -1 & 1 & 1 & 1 & 1 \\
\end{array}
$$

12 → (row), 14 ← (row)
16 → (row), 18 ← (row)

$$
\begin{array}{cccc|cccc}
-1 & -1 & -1 & -1 & 1 & 1 & 1 & 1 \\
-1 & -1 & -1 & -1 & 1 & 1 & 1 & 1 \\
-1 & -1 & -1 & -1 & 1 & 1 & 1 & 1 \\
-1 & -1 & -1 & -1 & 1 & 1 & 1 & 1 \\
\hline
1 & 1 & 1 & 1 & -1 & -1 & -1 & -1 \\
1 & 1 & 1 & 1 & -1 & -1 & -1 & -1 \\
1 & 1 & 1 & 1 & -1 & -1 & -1 & -1 \\
1 & 1 & 1 & 1 & -1 & -1 & -1 & -1 \\
\end{array}
$$

22 → (row), 24 ← (row)
26 → (row), 28 ← (row)

METHOD TO DETECT WATERMARK RESISTANT TO RESIZING AND TRANSLATION

FIELD OF THE INVENTION

This invention relates to the detection of watermarks on computer readable memory media. More particularly, this invention relates to a method of detecting block-based watermarks.

BACKGROUND OF THE INVENTION

It is of great concern to the music, video, software and publishing industries to be able to prevent and track improper copying of content from computer readable memory media or optical memory media (e.g., digital video disks (DVDs), compact disks (CDs), read only memory (ROM), random access memory (RAM), various magnetic media and other memory media). This concern has been addressed, in part, by the use of "watermarks", which are hidden messages arranged on a memory medium along with other content data, such as video data, audio data, various software applications, etc. The hidden message of a watermark is typically a copy control message such as "do not copy" or "copy only once".

For example, watermarks have been used on optical memory media, such as CD-ROMs and DVDs to prevent the undesired copying of music, movies and software. Notwithstanding such efforts to prevent unauthorized copying, the hidden message of a watermark can be blocked, obfuscated or otherwise bypassed when the watermark data is geometrically altered through shifting or resizing. Thus, commercial pirates seeking to wrongfully copy content data containing a watermark with a hidden "do not copy" message can bypass the watermark message through the use of editing and copying equipment that geometrically modifies the location or size of the content data in such a way as to render the watermark message unreadable. Such geometric modification has been accomplished in many different ways including resizing, cropping, warping, mirroring, etc.

Another situation in which the message of a watermark is compromised arises in the normal processing of a computer system or consumer device. For example, the digital content data of a DVD may be inadvertently altered while undergoing format processing from the European PAL TV system to the U.S. NTSC TV system, or vice versa. In addition, digital content data may be inadvertently altered through selectable format processing, such as changing the format for displaying wide-screen movies on a television set, or video editing on a personal computer. Such processing may inadvertently shift or resize the digital content data rendering the message of the watermark unreadable.

With respect to digital video data embedded on a DVD or the like, the data is arranged in numerous consecutive video frames. Watermarks typically carry a copy control message, such as "do not copy" and are arranged in one or more of the video frames to prevent unauthorized and undesired copying. However, consumer and professional playback, editing and copying equipment can be used to resize and shift the video data. The resizing factor and the shift factor can vary over continuous ranges.

In the case of either purposeful or inadvertent shifting and/or resizing of digital content data, the watermark in each frame is similarly shifted and/or resized. A data detector, such as a standard correlation detector or matched filter, is used to detect the presence of any watermark data in each frame of video data. The original reference position of the watermark in the content data is implicit in the hardware or software associated with the detector. When the frames have been shifted and/or resized, even by a very small amount, the correlation detector often cannot properly detect the presence of the watermark since it has been moved from its reference location. Thus, the content of the watermark message cannot be read. This occurs because prior art correlation kernel detectors are particularly dependent upon specific registration of the digital data patterns of the correlation within each video frame. Thus, a slight modification of the shifting factor or resizing factor can cause a correlation detector to fail to detect the correlation kernel since the watermark is no longer at its reference location. The content on the DVD or other optical memory media could then be copied.

When the watermark is used to provide a "do not copy" message for a movie, it may be placed in one or all of the frames of video data. The entire movie includes numerous successive frames. Each frame of content data may include the watermark. While the pattern of the watermark may vary from frame to frame, the "family" of the block-based pattern will remain the same throughout a certain number of successive video frames.

Different types of watermark systems exist which attempt to be robust to resizing and translation. One such watermark system typically embeds the watermark in a way that is mathematically invariant to resizing and translation. The detector used in this type of system does not have to adjust to changes in the position and/or size of the watermark. Such a system is typically based on Fourier-Mellin transforms and log-polar coordinates. One drawback of this system is that it requires complex mathematics and a particularly structured watermark pattern and detector. This system cannot be used with pre-existing watermarking systems.

Another prior art watermark system uses repetitive block-based watermarks, wherein all watermark blocks are identical. The block-based watermark in this type of system is typically large and designed to carry the entire copy-control message. The repetition of the same block makes is possible to estimate any resizing of the watermark by correlating different portions of the watermarked image and finding the spacing between certain positions. The resizing is then inverted and the reference block is correlated with the adjusted image to find the watermark and its position simultaneously. An example of this system is the Philips VIVA/JAWS+ watermarking system. A disadvantage of this system is that the design of the watermark must be spatially periodic, which does not always occur in an arbitrary watermarking system.

Yet another type of watermarking system includes an embedded template or helper pattern along with the watermark in digital content data. The detector knows the reference location, size and shape of the template. The detector attempts to detect the template and then uses the detected position of the template to estimate the actual location and size of the watermark. The system then reverses any geometric alterations so that the correlation detector can detect and interpret the watermark. This system is disadvantageous, however, since the templates tend to be fragile and easily attacked.

The present invention overcomes the drawbacks of the prior art by estimating translation and resizing of a block-based watermark using the structure of the block-based watermark itself, without requiring the watermark to be spatially periodic. The computations of the method of the present invention are done completely in the detector. Moreover, the present invention can be implemented in existing block-based watermarking systems without changing the embedding of the watermark. The present invention does not require as much memory as the prior art watermark detection systems nor does it require templates additional to the watermark. The present invention also allows for detection and interpretation of the watermark without resizing and translating each frame. Finally, the present invention also allows for accurate estimates of translation and resizing of a watermark based on just a single video frame, rather than the accumulation of several frames.

SUMMARY OF THE INVENTION

In accordance with a first aspect of the present invention, a method of detecting block-based watermark data carrying a hidden message embedded in at least one frame of content data on a computer readable memory medium is provided. The method comprises filtering the watermark data to produce filtered data, calculating the absolute value of the filtered data to produce absolute value data containing center data corresponding to centers of each block in the watermark data, comparing the center data to reference data stored in a memory associated with a watermark detector relating to the expected location of the watermark data, calculating any deviation between the center data and the reference data and utilizing the deviation to detect the hidden message of the watermark.

The method is capable of detecting the hidden message of the block-based watermark data within the content data even if it has been shifted or if noise has been added to it.

The method of the invention is capable of detecting the hidden message of the block-based watermark even if the watermark has been resized.

In a preferred embodiment, the computer readable memory medium comprises an optical medium. The optical medium may comprise a DVD, a CD-ROM, or any other storage device that can be optically read by an associated computer or other detecting device.

It is preferable for the method to comprise filtering the watermark data to produce filtered data arranged in a matrix of rows and columns, calculating the absolute value of the filtered data to produce absolute value data arranged in a matrix of rows and columns, summing the absolute value data along each row of filtered data to generate a row projection signal containing center data corresponding to the centers of each block of the block-based watermark data, summing the absolute value data along each column of filtered data to generate a column projection signal containing center data corresponding to the centers of each block of the block-based watermark data, comparing the center data to reference data stored in memory associated with a watermark detector relating to the expected location of the watermark data within the frame, calculating the deviation between the center data and the reference data, and using the calculated deviation to detect the hidden message of the watermark.

The method of the invention is capable of detecting the hidden message of the block-based watermark even if the watermark has been shifted and/or resized.

The method may also comprise the steps of filtering the watermark data to produce filtered data arranged in a matrix of rows and columns, calculating the absolute value of the filtered data to produce absolute value data arranged in a matrix of rows and columns, summing the absolute value data along each row of filtered data to generate a row projection signal containing center data corresponding to the center of each block of the block-based watermark data, summing the absolute value data along each column of filtered data to generate a column projection signal containing center data corresponding to the center of each block of the block-based watermark data, comparing the center data to reference data stored in memory associated with a watermark detector relating to the expected location of the watermark data within said at least one frame, calculating the deviation between the center data and the reference data, and using the calculated deviation to detect the hidden message of the watermark data.

The watermark data may be arranged in a matrix of rows and columns of blocks on a computer readable memory medium. The method may comprise linearly filtering the watermark data using a finite impulse response filter to produce filtered data arranged in a matrix of rows and columns, calculating the absolute value of the filtered data to produce absolute value data arranged in a matrix of rows and columns, summing the absolute value data along each row of filtered data to generate a row projection signal comprising row center data corresponding to centers of said rows of blocks of said watermark data, summing the absolute value data along each column of filtered data to generate a column projection signal comprising column center data corresponding to centers of said columns of said blocks of watermark data, comparing the row and column center data to reference data stored in memory associated with a watermark detector relating to the expected location of the watermark data, calculating the deviation between the center data and the reference data, and using the calculated deviation to detect the hidden message of the watermark data.

The foregoing features of the present invention may be further appreciated with reference to the following description of the preferred embodiment and accompanying drawings.

BRIEF DESCRIPTION OF THE DRAWINGS

FIG. 1A is a schematic illustration of a 1-block according to the present invention.

FIG. 1B is a schematic illustration of a 0-block according to the present invention.

DETAILED DESCRIPTION OF THE PREFERRED EMBODIMENT

Figure 1C:
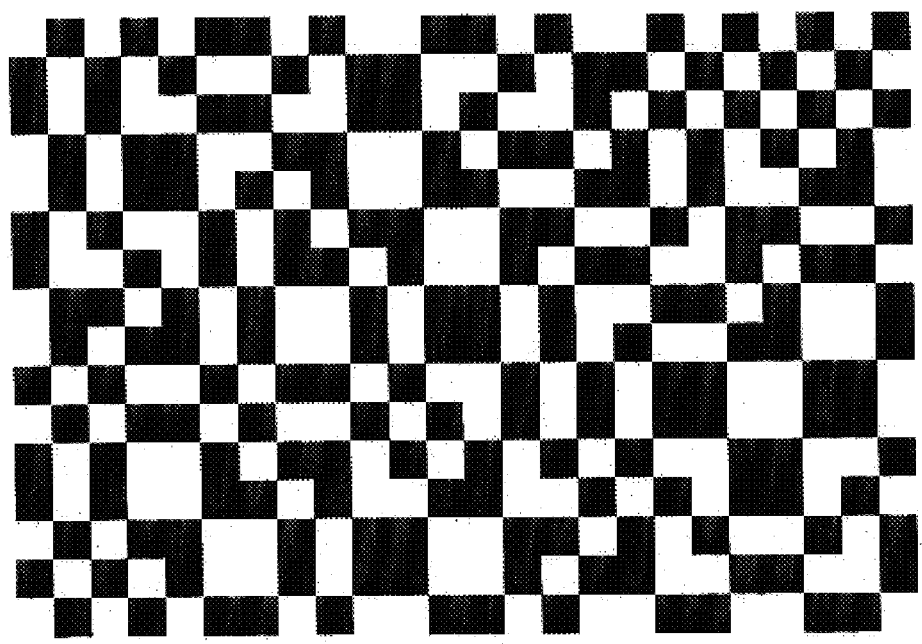
FIG. 1C is a schematic illustration of a block-based watermark.

One type of watermark which can be embedded in digital content data is a block-based watermark. A block-based watermark comprises a plurality of individual matrices or blocks such as the block shown in FIG. 1A.

FIG. 1A shows a 1-block 10 known as an elementary block. The 1-block is embedded with a binary sequence. The binary sequence may comprise any two values (a and b). In the 1-block 10, the binary sequence comprises the values of 1 and −1. Thus, each cell of the 1-block 10 is assigned a value of either 1 or −1. Each cell of the 1-block corresponds to a pixel in a video image. As shown, the 1-block 10 has four quadrants 12, 14, 16 and 18 having alternating values. Thus, quadrants 12 and 18 are assigned the value of 1, while quadrants 14 and 16 are assigned the value of −1.

FIG. 1B shows a 0-block 20. The 0-block 20 is a 1-block in an inverted configuration. Thus, the 0-block has an embedded binary sequence opposite that of the 1-block 10. Each quadrant 22, 24, 26 and 28 of the 0-block 20 has a value opposite of the value of the corresponding quadrants of 1-block 10. Thus, quadrants 22 and 28 have a value of −1 and quadrants 24 and 26 have a value of 1.

FIG. 1C shows a block-based watermark or block-based watermark data 30 comprising a repetitive pattern of 1-blocks 10 and 0-blocks 20. The watermark 30 may be embedded in content data such as video data so that when the content data is displayed on a video display, the watermark is not readily apparent to the naked eye. A specific predetermined arrangement of 1-blocks and 0-blocks is designated to be a particular copy control message, such as "do not copy" or "copy only once."

Figure 1D:
FIG. 1D is an illustration of video data with a block-based watermark.

FIG. 1D shows a display of video data having the watermark 30 embedded in video data, where the watermark 30 is not visible to the naked eye.

The watermark 30 is preferably the same size as the frame containing the content data. As discussed, the watermark 30 contains a hidden message designated by the predetermined pattern of the blocks comprising the watermark. Each block that comprises the watermark 30 corresponds to a bit. Thus, a 1-block and a 0-block correspond to bit values of 1 and 0, respectively, in a binary sequence. A certain pattern of this binary sequence is then selected to represent a copy control message, such as "do not copy" or "copy only once." Thus, once the location of the watermark is determined, its underlying hidden copy control message may be read by a detector. The detector may include a conventional correlation detector or a matched filter to detect the presence of the watermark in each frame.

The present invention relates to a method of detecting a block-based watermark 30 embedded in content data. The method will detect the location of the block-based watermark 30 regardless of whether the content data has been subjected to alterations such as shifting and resizing. The method will further determine the degree of deviation in shifting or resizing that a watermark may have undergone from the original reference location of the watermark in the frame. After the watermark is located according to the method of the present invention, the deviation between the reference and actual watermark locations is used to detect the underlying hidden message of the watermark so that the hidden message can then be read and processed.

In the context of DVDs, an associated DVD player will be able to find the location of the watermark within the frame containing the watermarked content data and determine the degree deviation of shifting and resizing from the original reference location of the watermark, regardless of a pirate's efforts to resize or shift the video frames, or any inadvertent resizing or shifting that may have occurred during the processing of the watermarked content data.

Although this preferred method will be described in the context of a digital watermark embedded in frames of video data on an optical medium, such as a DVD, it should be appreciated that the method of the present invention applies to all computer readable memory media and all types of content data, and is not limited to digital data or any particular type of video or audio data.

Figure 2:
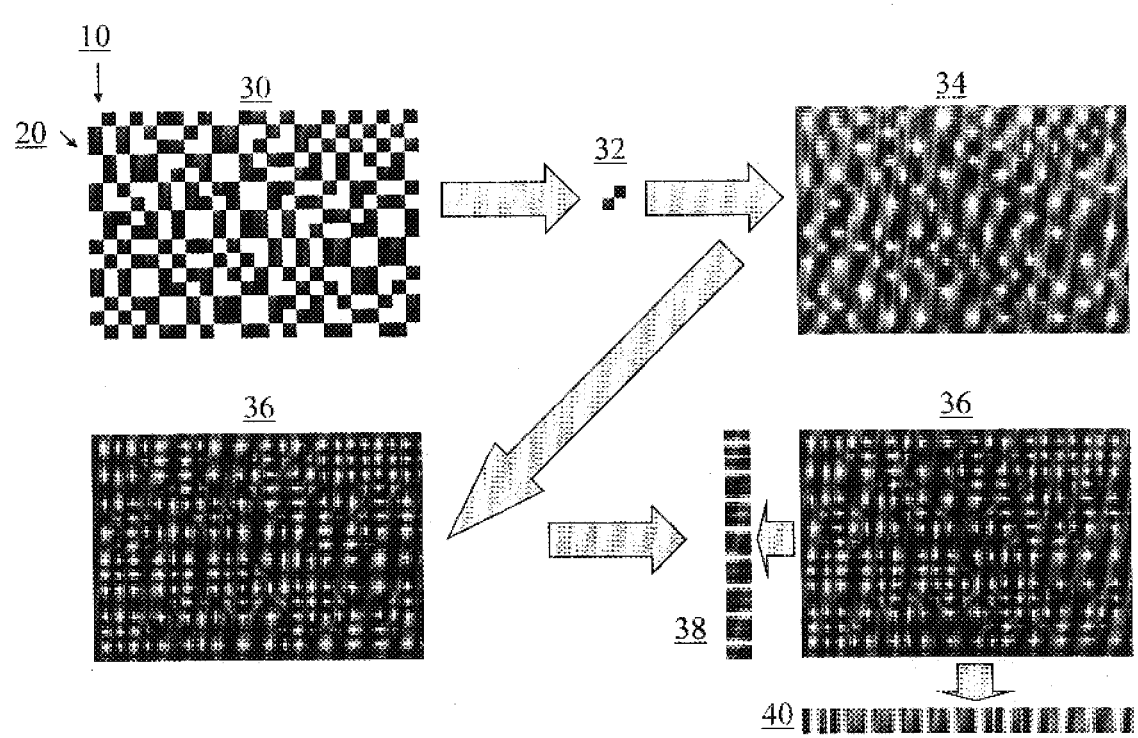
FIG. 2 is a schematic illustration of a method of detecting block-based watermark data according to the present invention.

FIG. 2 shows a schematic illustration of a method of detecting a block-based watermark pattern according to the present invention. For simplicity of explanation, FIG. 2 shows the method of the present invention performed on watermark data that has not been embedded in content data. The method of the present invention applied to watermarked video data is later described in reference to FIGS. 6–10.

The watermark data 30 is a block-based watermark as shown in FIG. 1C, as discussed below. White represents a value of +1, black represents a value of −1, and each cell of a block corresponds to a pixel in a video image. The watermark data of the present invention may be any size, n×m, where n is the number of pixel rows and m is the number of pixel columns. Preferably, the watermark data is the same size as the frame containing the video data in which it is embedded. The watermark is located at a reference location within the frame. The reference location is known by the detector.

A filter 32 comprises an N×N window and a mathematical operation within the window. FIG. 2 shows an 8×8 filter 32. According to a first step of the method of the present invention, the filter 32 is centered over every pixel in the video image. At each position, the mathematical operation is used to generate an output pixel corresponding to the center of the window. Standard techniques may be used to fill the filter window when it is centered over pixels near the boundaries of the image. The mathematical operation generates a large output value at the center of each of the 0-blocks and 1-blocks that comprises the watermark. As the filter 32 scans the entire image, it generates the greatest values at the center of each block.

In a preferred embodiment, the filter is a finite-impulse-response linear filter. The filter is defined by an N×N block of coefficients and a multiply and sum operation, which may be digitally performed through appropriate circuitry having the required logic gates. Alternatively, the mathematical operation can be performed through software. For each position of the N×N filter window on an image, the N×N block of coefficients is overlaid on the block of pixels in the filter window. Each pixel value is multiplied by its corresponding coefficient to produce a product, and the corresponding products for each pixel are summed to produce a single output filtered value for each pixel. Thus, using an 8×8 filter window 32 and a 1-block 10 as the block of coefficients, the filtered values will be large and positive at the center of a 1-block in the watermark and large and negative at the center of a 0-block in the watermark.

Of course, the present invention contemplates the use of other types of filters to perform the filtering step. Examples of other types of filters that may be used in the filtering step include a linear non-FIR filter, order statistic filters, stack filters, linear or nonlinear adaptive filters, linear or nonlinear classifiers and neural networks.

The filtered data 34 comprises peaks (maxima and/or minima) corresponding to the centers of each block of the watermark data. As shown in FIG. 2, the maximums or bright spots occur at the center of each 1-block and have a value of 64 and the minimums or dark spots occur at the center of each 0-block and have a value of −64.

Thus, as will be shown later with respect to watermarked video data, the filtering step enhances and reinforces the watermark data and filters out image data, when filtering is performed on watermarked video data.

The next step of the method is the computation of the absolute value of the filtered data. The computation of the absolute value may be implemented as a memoryless non-linearity or lookup table. Computing the absolute value of the filtered image converts any negative peaks to positive peaks. Thus, the method works for a variety of watermarks, regardless of the polarities of the embedded binary sequence. The absolute value image 36 is generated using the absolute value of each location of the filtered data. Of course the present invention contemplates that, for certain nonlinear filters, the absolute value step may be combined with the filtering step.

Figure 3:
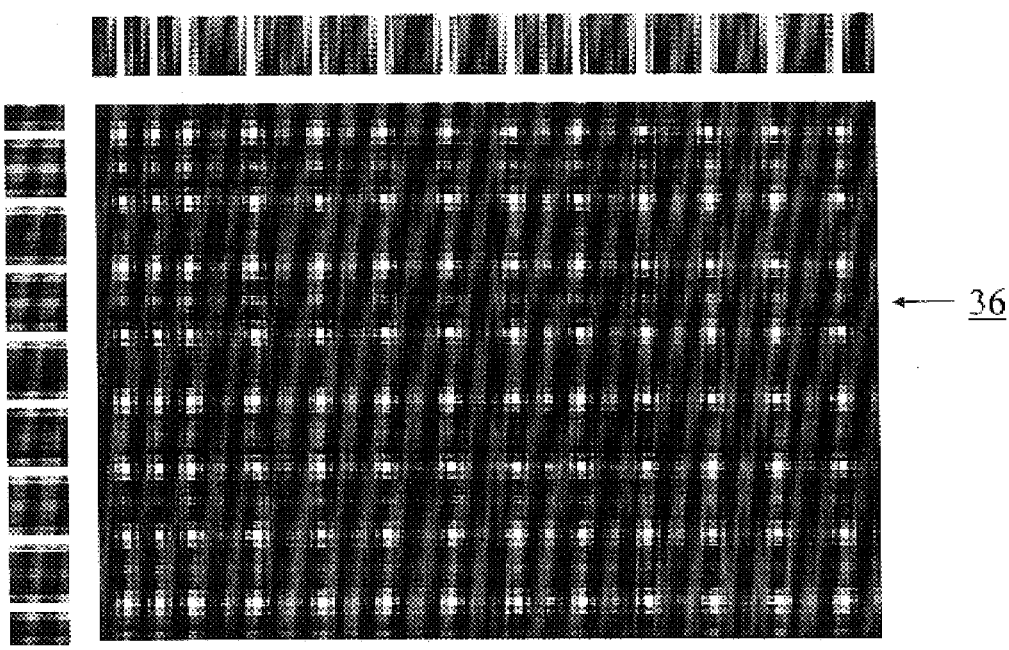
FIG. 3 is a schematic enlarged illustration of absolute value data according to the present invention.

FIG. 3 shows an enlarged illustration of the absolute value image 36. As shown in FIG. 3, the bright spots of the absolute value data 36 correspond to the estimated centers of each of the blocks of the watermark 30. The absolute value data 36 provides a clear image of the centers of the blocks comprising the watermark. Therefore, the absolute value data is useful in detecting the watermark data and ultimately the content of its message. The location of the centers of each block as displayed in the absolute value data may be compared to the reference location of the watermark to determine whether the watermark has been shifted or resized. If the brightest spots in the absolute value data appear at the known reference location of the centers of the blocks of the watermark data, then no shifting or resizing has occurred. The illustration of FIG. 3 indicates that no shifting or resizing has occurred to the watermark data, since the brightest spots in the absolute value data occur where the centers of each block are known to be.

In addition to using the absolute value data to determine the location of the watermark and whether the watermark has been shifted or resized, further processing may be performed to eliminate the need for a two dimensional comparison between the reference location of the watermark and the absolute value data. Thus, the next step is to obtain the sum of the values of each row and column of the absolute value data. The summing of each value along each row of the absolute value data generates a row projection 38. The summing of each value along each column of the absolute value data generates a columns projection 40.

It is preferable to calculate the row and column projection signals because there is a possibility that some of the block centers may not have been detected in the filtering step. Thus, instead of having to detect every single block in the watermark, as long as the majority of blocks in a row or column are detected, the projection signal in that row or column will be strong enough to show whether that particular row or column comprises the vertical or horizontal center of a block. Moreover, the summing step turns the previous two dimensional problem into 2 one-dimensional problems. Thus, using the row and column projection signals in combination, the location of each center of each block within a frame may be determined.

Figure 4:
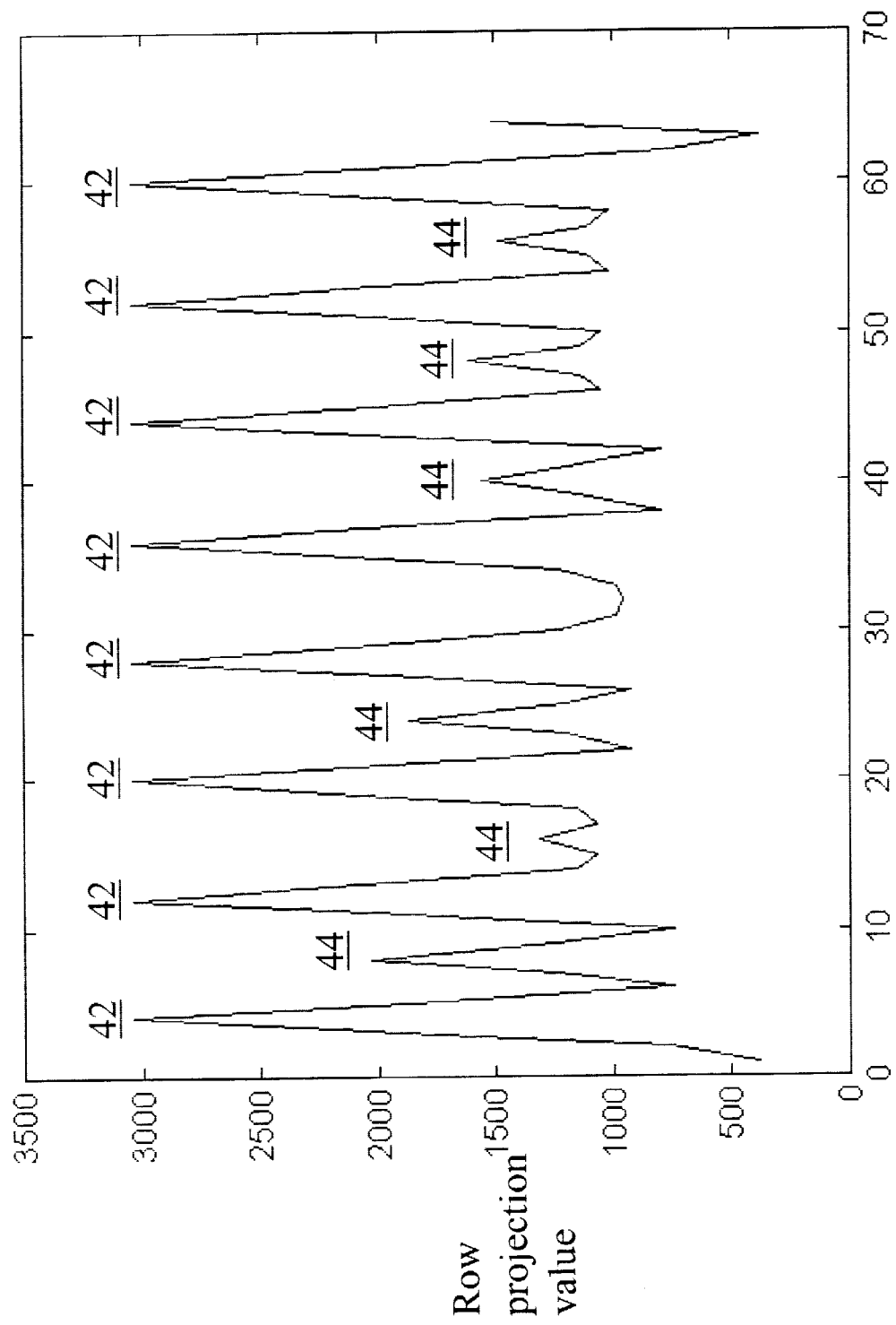
FIG. 4 is a plot of the row projection signal

The next step in the method of the present invention is to use the row and column projection signals to determine the location of the watermark and to determine whether the watermark has been shifted or resized. FIG. 4 illustrates the row projection signal value 38 plotted along the vertical location in a frame. The row projection signal comprises maximum values of center data resulting in true peaks 42 in the plot. These true peaks comprise center data corresponding to the center of each row of blocks comprising the watermark data. Thus, FIG. 4 illustrates the vertical location of the center of each row of blocks occurring at each true peak.

As also shown in FIG. 4, the location of the center of the first row of blocks is at the fourth vertical pixel, the center of the second row of blocks is located at the twelfth vertical pixel, third row of blocks at the twentieth vertical pixel, etc. FIG. 4 also depicts false peaks 44. This occurs when the detector finds false block centers by combining pieces of neighboring blocks. The false peaks 44 are typically at a lower level than the true peaks 42 and thus do not interfere with determining the location of the watermark.

Figure 5:
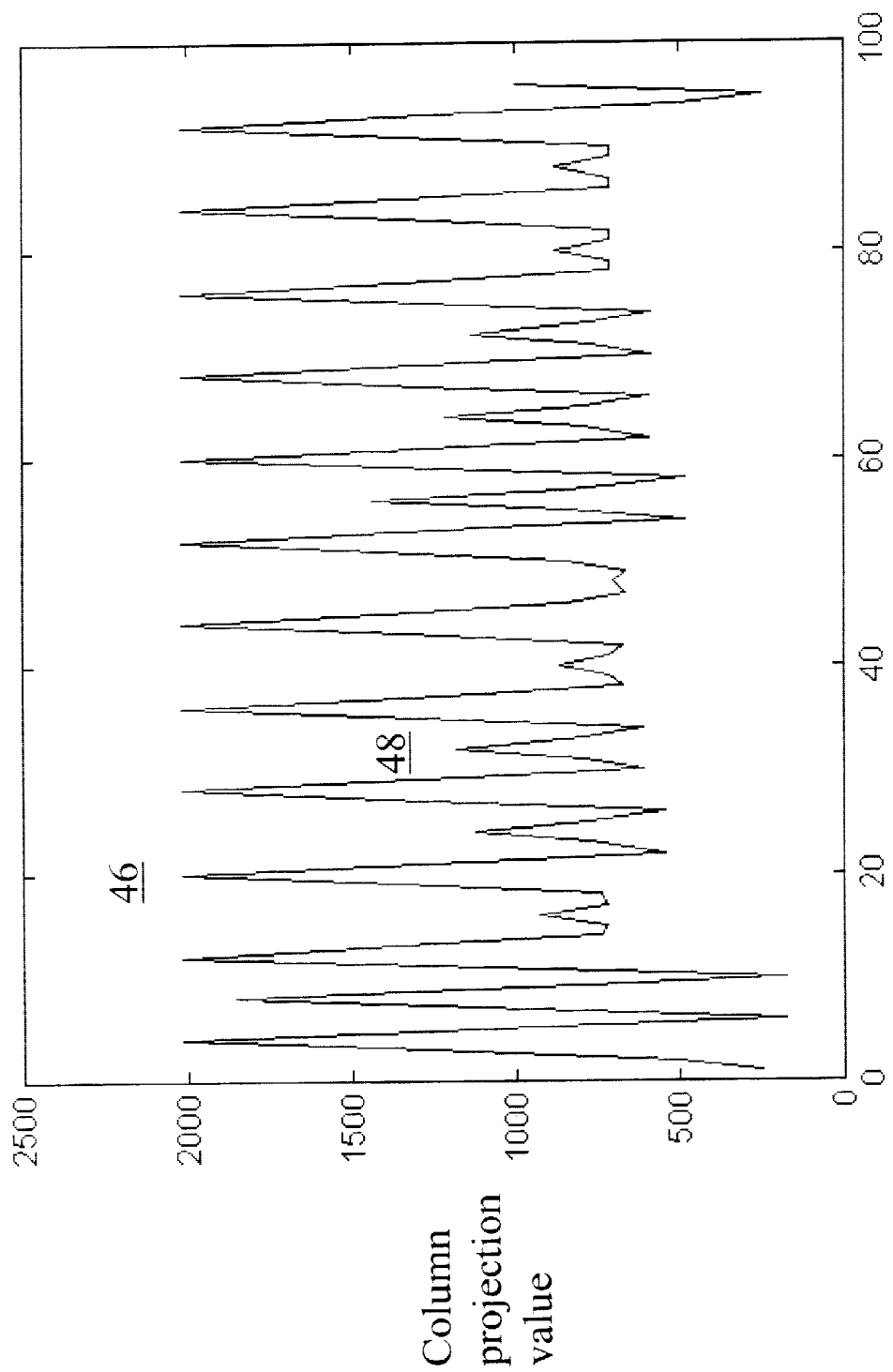
FIG. 5 is a plot of the column projection signal.

FIG. 5 illustrates the column projection signal plotted along the horizontal location in a frame. The column projection signal comprises maximum values of center data resulting in true peaks 46 in the plot. These true peaks comprise center data corresponding to the center of each column of blocks comprising the watermark data. The horizontal pixel location of the center of each block column is indicated by the location of its corresponding true peak 46.

As shown in FIG. 5, the location of the center of the first block column is at the fourth horizontal pixel, the center of the second block column is located at the eighth horizontal pixel, the center of the third block column is located at the twelfth horizontal pixel, etc. FIG. 5 also depicts false peaks 48. Again, this occurs when the detector finds false block centers by combining pieces of neighboring blocks. The false peaks 48 are typically at a lower level than the true peaks 46 and thus do not interfere with determining the location of the watermark.

Reference data corresponding to the original or expected location of the watermark data is stored in the memory associated with the watermark detector. Such memory may be RAM or other hardware associated with the detector. Alternatively, the reference data may come from software, in which case, the "memory" would be considered whatever storage medium is used to retain the software. By combining the results of the row projection and the column projection, the grid of the watermark is detected. The present method then compares the center data of the row and column projection signals to the reference data of the watermark. By calculating any deviation between the center data and reference data, a determination may be made as to whether the watermark has been shifted and resized using the calculated deviation. If the watermark data has been shifted, the true peaks or center data will occur at pixel locations shifted away from the known reference locations. Additionally, a determination made as to whether the watermark data has been resized.

Figure 6:
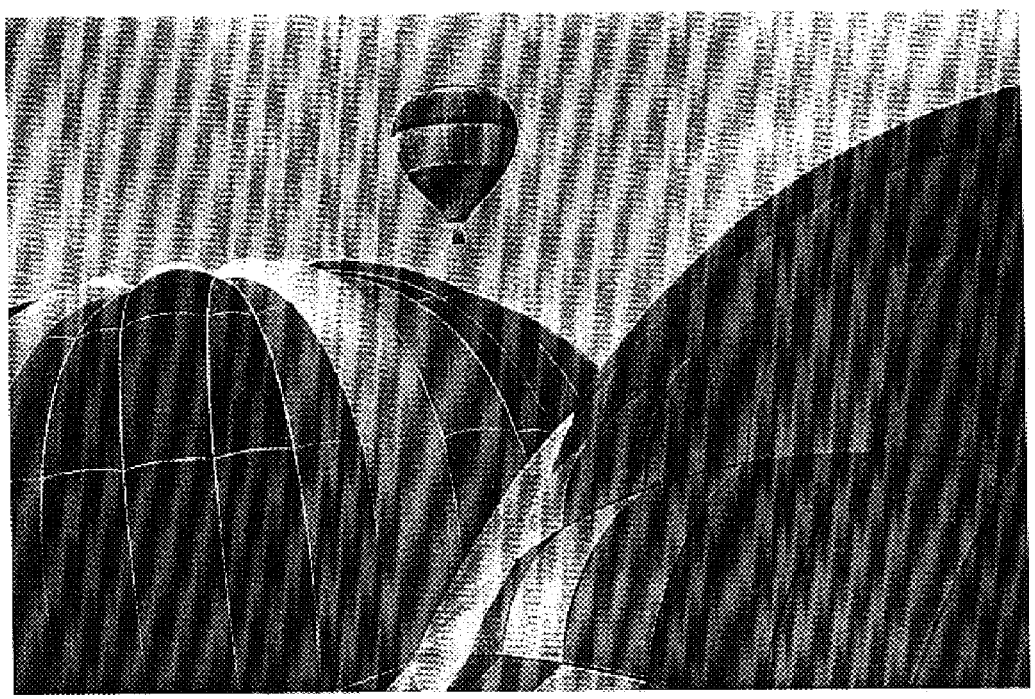
FIG. 6 is an illustration of video data containing block-based watermark data.

In reference to FIGS. 6–10, the method of the present invention is now described as applied to watermarked content data, or watermarked video data. FIG. 6 shows content data 50 comprising a digital video image in a frame having a hidden block-based watermark data embedded in it. The watermark data is the same size as the video image in the frame and is not visible to the naked eye. The method of the present invention is now applied to the content data of FIG.

6 in order to detect the presence, location and hidden message of the watermark data.

According to a preferred method of the present invention, the watermark content data 50 is filtered using the filter 32. Preferably, a linear filter operation is performed on the watermarked content data 50 using the FIR filter 32. The filtered values of each location are used to form filtered data (not shown). The filtering steps reinforces and enhances the watermark data and filters out the image detail data.

Figure 7:
FIG. 7 is an illustration of absolute value image of the data of FIG. 6.

The next step of computing the absolute value of the filtered data is then performed. Absolute value data 52 (FIG. 7) is generated using the absolute value of the filtered data. As shown in FIG. 7, the absolute value data 52 contains undesirable strong white lines resulting from the original video image detail. The strong lines have survived the filtering process and are readily apparent along the outlining of the balloon depicted in the original video image. The strong lines also generate spurious peaks in the row and column projections.

The strong lines may be eliminated from the absolute value image 52, when the embedding level of the watermark data is known. For example, when the embedding level is known, the expected maximum value of the filtered data may be computed. Any values that fall outside of the maximum value are attributable to the original image detail. For example, using a watermark data is embedded in a content data at an embedding level "E", the expected maximum value of the peaks of the row and column projections would be 64E. Any values greater than 64E are set to zero, therefore eliminating the strong lines in the absolute value image. This method of eliminating image detail from the filtered image may be implemented as a simple memoryless nonlinearity or lookup table. The method may be combined with the absolute value step into one operation. In addition, if a nonlinear filter or a neural network is used in the filter step, this method may be combined with the filter step into one operation.

Figure 8:
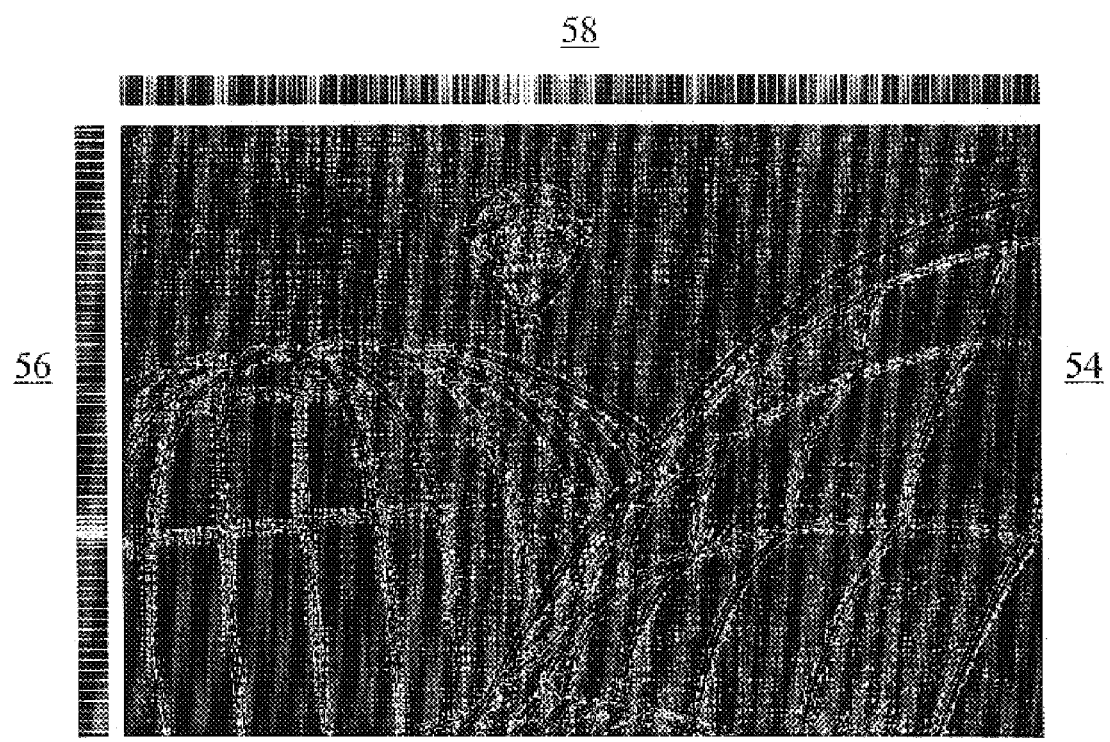
FIG. 8 is an illustration of a modified absolute value image of the data of FIG. 6.

FIG. 8 shows modified absolute value data 54 of filtered data. In the modified absolute value data, any values exceeding the known maximum value of the data have been set to zero. Consequently, the modified absolute value data is much clearer than the absolute value data 52 and does not contain the undesirable strong lines. Thus, the presence of the watermark within the video data has been enhanced and reinforced through the filtering step and absolute value step. The bright spots in the modified absolute value data 54 correspond to the center of each block that comprises the watermark data. Thus, the location of each bright spot may be compared to the known reference location of the watermark data to determine whether the watermark has been shifted or resized.

As previously discussed, to simplify the comparison of the absolute value data to the reference location, the method of the present invention provides for the summing steps. Thus, FIG. 8 further shows a row projection signal 56 and a column projection signal 58. The row projection signal is calculated by summing the absolute value data along each row and the columns projection signal is calculated by summing the absolute value data along each column.

Figure 9:
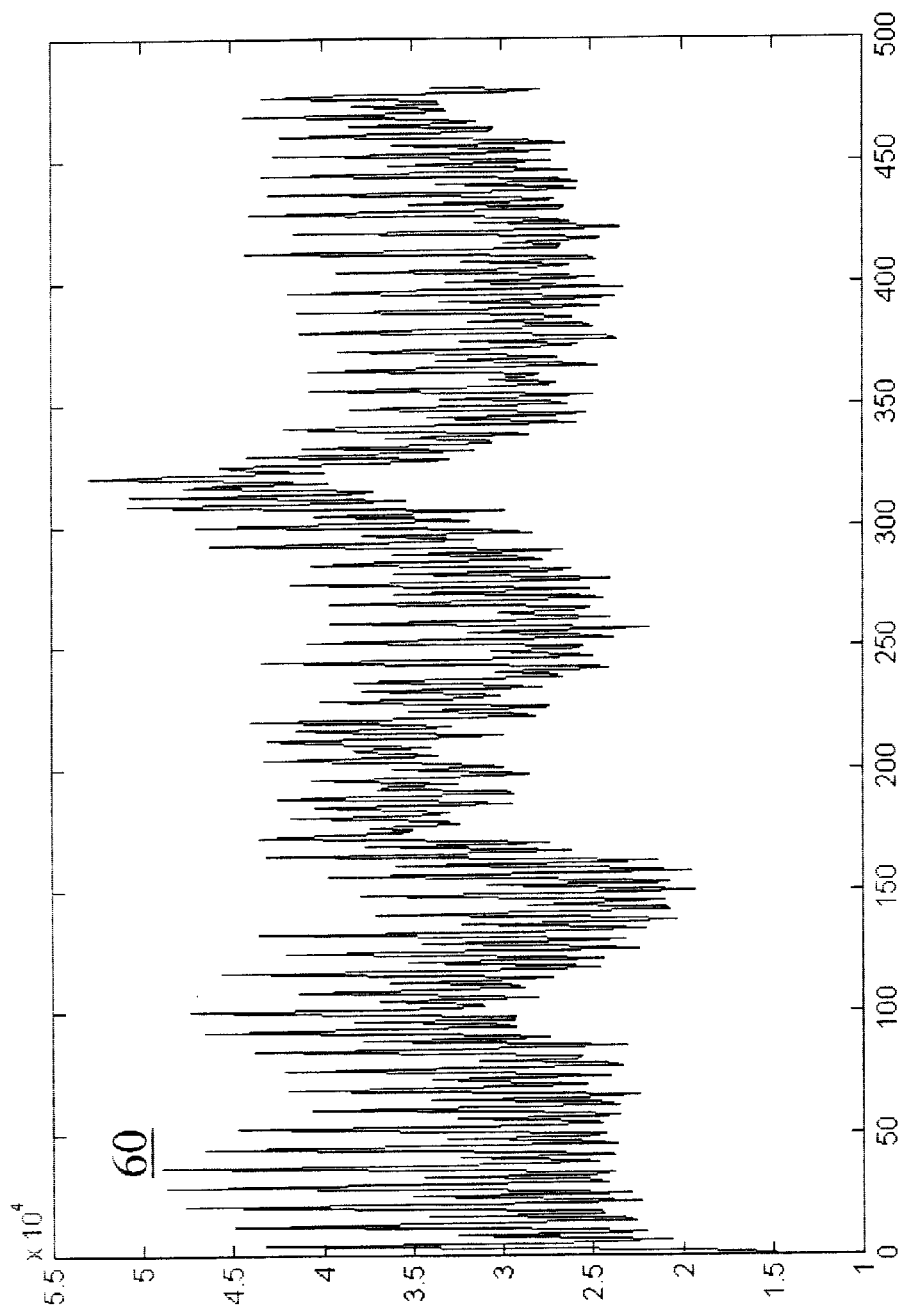
FIG. 9 is a plot of the row projection signal of FIG. 8.

FIG. 9 shows the row projection signal 56 plotted along the vertical axis of the frame. Each true peak 60 shows the vertical location of the center of each row of blocks. Again, there are false peaks present, which result from pieces of neighboring blocks being read as single blocks. FIG. 9 further shows the presence of noise due to the video image data itself. Although the signal is noisy, the true peaks 60 are still readable. As shown in the figure, the vertical location of the center of each row of blocks may be determined using the location of each true peak 60.

Figure 10:
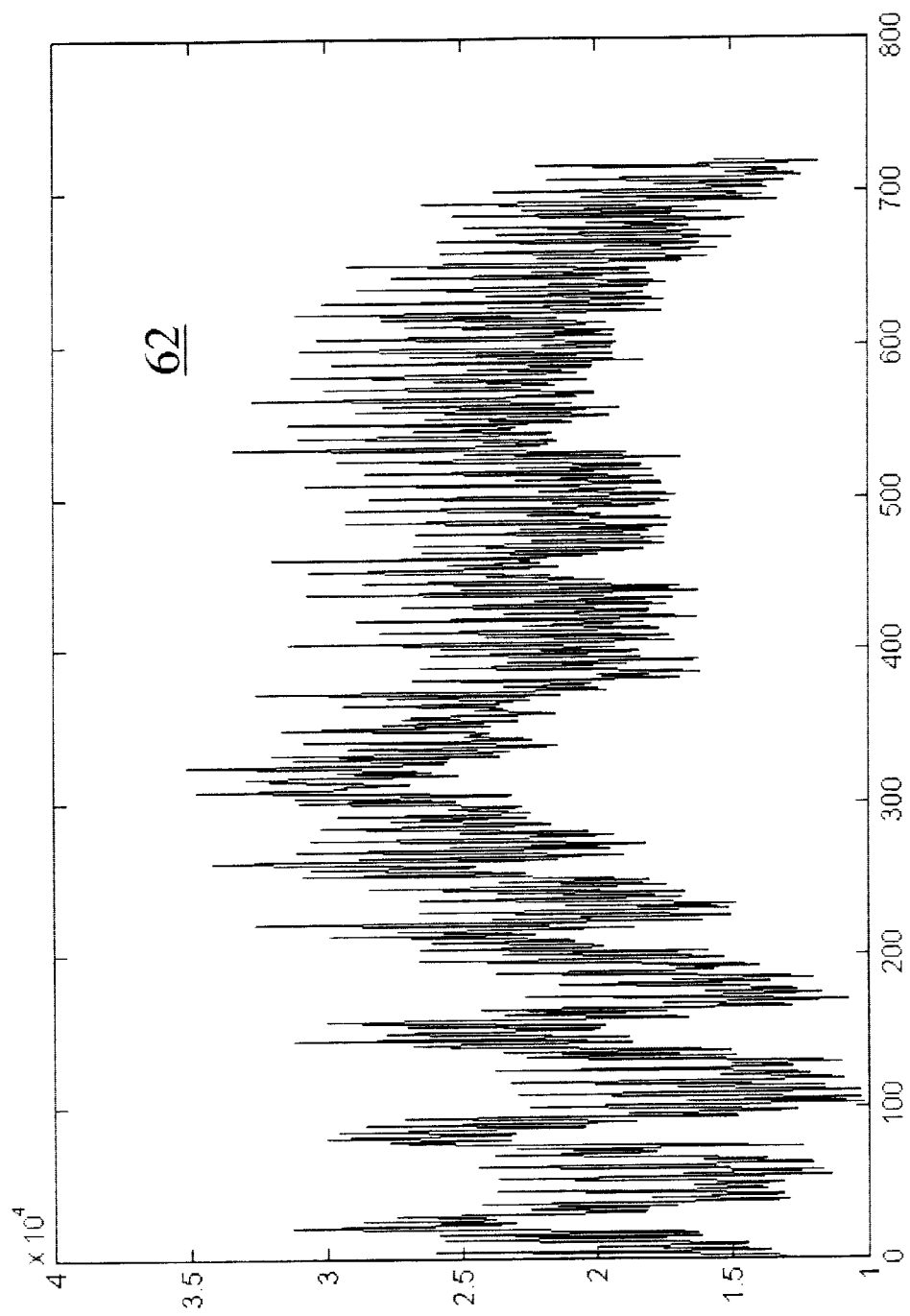
FIG. 10 is a plot of the column projection signal of FIG. 8.

Similarly, FIG. 10 illustrates the column projection signal plotted along the horizontal axis of the frame. True peaks 62 correspond to the centers of each column of blocks. Again, the noise in the signal is a result of the video image data.

By using the row projection signal and the column projection signal, the location of the watermark within the frame containing the video data is determined and compared to the original reference location of the watermark. In this particular case, the watermark data has not been resized or shifted since the centers of the blocks are located at the reference locations.

Figure 11:
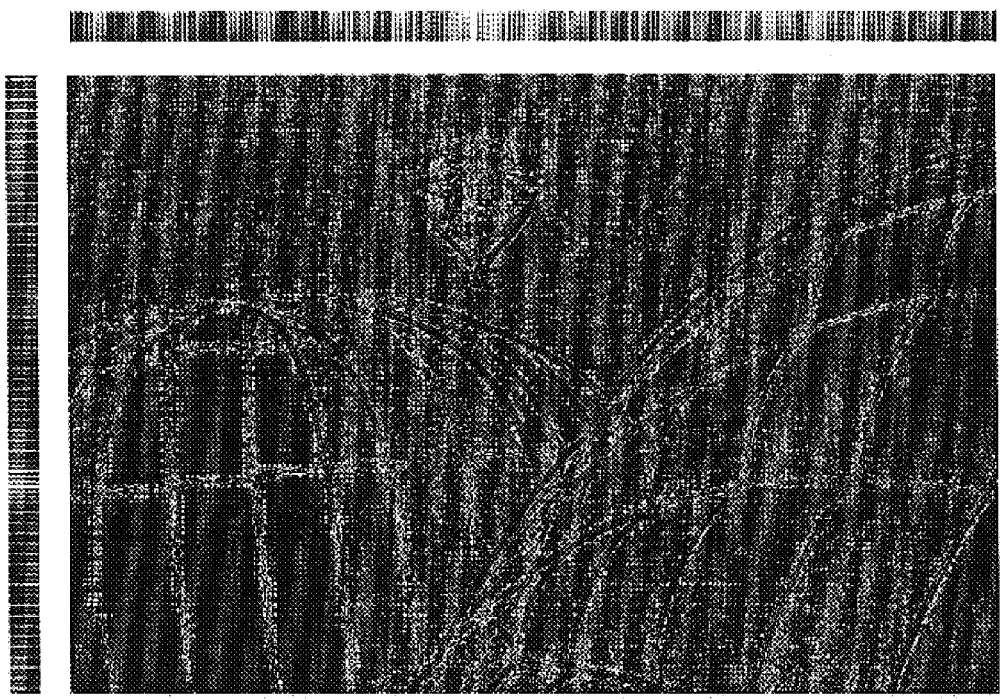
FIG. 11 is an illustration of absolute value image of video data containing enlarged block-based watermark data.
Figure 12:
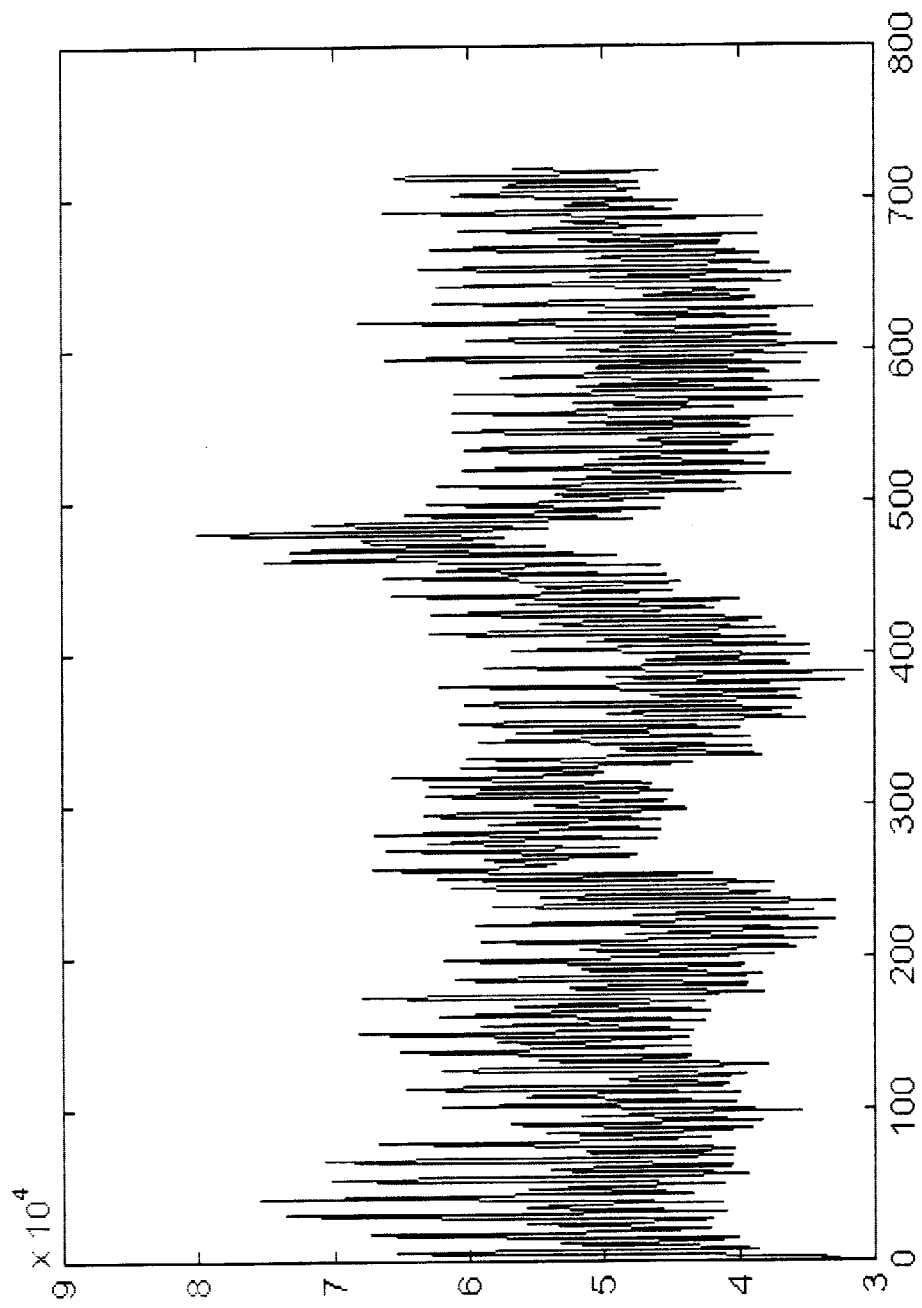
FIG. 12 is a plot of the row projection signal of FIG. 11.
Figure 13:
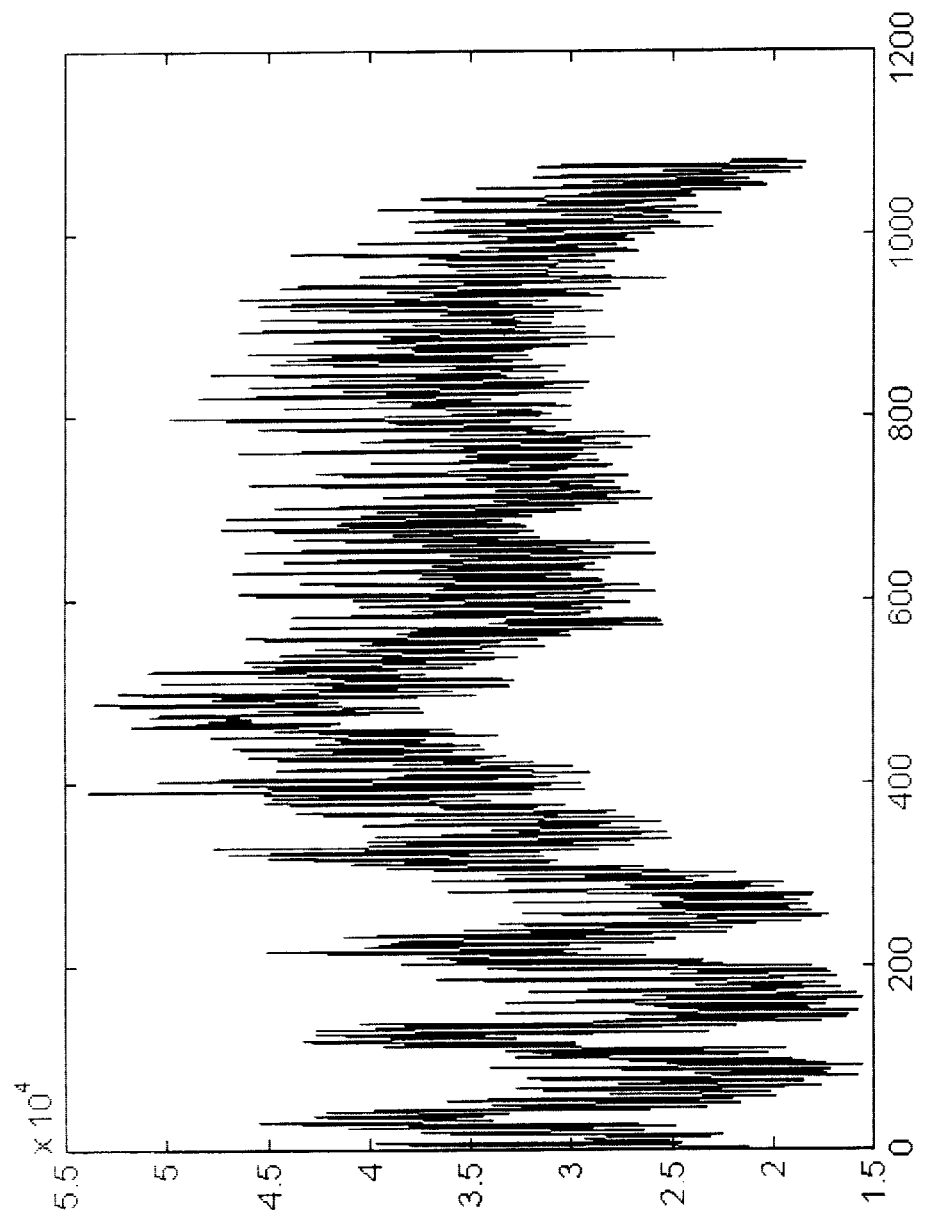
FIG. 13 is a plot of the column projection signal of FIG. 11.

FIG. 11 shows the absolute value data for watermarked content data containing watermark data that has been zoomed by a factor of 1.5. The original blocks in the watermark were 8×8 and the resized blocks are 12×12. As a whole the watermark has not been shifted, but the only shifting that has occurred to the center of the blocks is a result of the resizing. FIGS. 12 and 13 illustrate the resulting row projection signals and the column projection signals. The row projection signals and column projection signals continue to produce true peaks. The true peaks correspond to the centers of the rows and columns blocks comprising the watermark data. Therefore, although the watermark has been resized, the location of the watermark data within the frame may still be determined by reading the row and column projection signals. Thus, the centers of the blocks are not occurring at the reference location of the watermark data. By comparing the true peaks of the row and column projection signals in FIGS. 12 and 13 to the reference location of the watermark data, a determination may be made as to the resizing factor.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method of detecting block-based watermark data carrying a hidden message embedded in at least one frame of content data on a computer readable memory medium, said method comprising the steps of:

filtering said content data to produce filtered data;

calculating the absolute value of said filtered data to produce absolute value data, wherein said absolute value data comprises center data corresponding to centers of each block of said block-based watermark data;

comparing said center data to reference data stored in memory associated with a watermark detector relating to the expected location of said watermark;

calculating any deviation between said center data and said reference data; and utilizing any calculated deviation between said center data and said reference data to detect the hidden message of said watermark data.

2. The method of claim 1, wherein a linear filter is employed to perform said filtering step.

3. The method of claim 2, wherein said linear filter performs multiplication and addition computations.

4. The method of claim 1, wherein said filtering step is performed using a finite impulse response filter.

5. The method of claim 4, wherein said filtering step is performed using said finite impulse response filter including an 8×8 matrix embedded with a binary sequence comprising the values of 1 and −1.

6. The method of claim 1, wherein said filtering step is accomplished using a filter chosen from the group consisting of an adaptive filter, a non-FIR filter, and a nonlinear filter.

7. The method of claim 1, wherein a memoryless nonlinearity is employed to perform said calculating step.

8. The method of claim 1, wherein a lookup table is employed to perform said calculating.

9. The method of claim 1, wherein a neural network is employed to perform said filtering step and said calculating step.

10. A method of detecting block-based watermark data carrying a hidden message embedded in at least one frame of content data on a computer readable memory medium, said method comprising the steps of:

filtering said content data to produce filtered data arranged in a matrix of rows and columns;

calculating the absolute value of said filtered data to produce absolute value data arranged in a matrix of rows and columns;

summing said absolute value data along each row of filtered data to generate a row projection signal;

summing said absolute value data along each column of filtered data to generate a column projection signal, wherein said row and column projection signals comprise center data corresponding to centers of each block of said block-based watermark data;

comparing said center data to reference data stored in memory associated with a watermark detector relating to the expected location of said watermark data within said at least one frame;

calculating any deviation between said center data and said reference data; and utilizing any calculated deviation between said center data and said reference data to detect the hidden message of said watermark data.

11. The method of claim 10, wherein a linear filter is employed to perform said filtering step.

12. The method of claim 11, wherein said linear filter performs multiplication and addition computations.

13. The method of claim 10, wherein said filtering step is performed using a finite impulse response filter.

14. The method of claim 13, wherein said filtering step is performed using said finite impulse response filter including an 8×8 matrix embedded with a binary sequence comprising the values of 1 and −1.

15. The method of claim 10, wherein said filtering step is accomplished using a filter chosen from the group consisting of an adaptive filter, a non-FIR filter, and a nonlinear filter.

16. The method of claim 11, wherein a memoryless nonlinearity is employed to perform said calculating step.

17. The method of claim 11, wherein a lookup table is employed to perform said calculating step.

18. The method of claim 11, wherein a neural network is employed to perform said filtering step and said calculating step.

19. A method of detecting block-based watermark data carrying a hidden message embedded in at least one frame of content data on a computer readable memory medium, said method comprising the steps of:

linearly filtering said content data using a finite impulse response filter to produce filtered data arranged in a matrix of rows and columns;

calculating the absolute value of said filtered data to produce absolute value data arranged in a matrix of rows and columns;

summing said absolute value data along each row of filtered data to generate a row projection signal comprising row center data corresponding to centers of said rows of blocks of said watermark data;

summing said absolute value data along each column of filtered data to generate a column projection signal comprising column center data corresponding to centers of said columns of said blocks of watermark data; and comparing said row and column center data to reference data stored in memory associated with a watermark detector relating to the expected location of said watermark data;

calculating any deviation between said center data and said reference data; and utilizing any calculated deviation between said center data and said reference data to detect the hidden message of said watermark data.

20. The method of claim 19, wherein said finite impulse response filter performs multiplication and addition computations.

21. The method of claim 19, wherein said finite impulse response filter is an 8×8 matrix embedded with a binary sequence comprising the values of 1 and −1.

22. The method of claim 19, wherein said filtering step is accomplished using a filter chosen from the group consisting or an adaptive filter, a non-FIR filter, and a nonlinear filter.

23. The method of claim 19, wherein a memoryless nonlinearity is employed to perform said calculating step.

24. The method of claim 19, wherein a lookup table is employed to perform said calculating.

25. The method of claim 19, wherein a neural network is employed to perform said filtering step.

* * * * *

UNITED STATES PATENT AND TRADEMARK OFFICE
CERTIFICATE OF CORRECTION

PATENT NO. : 6,795,565 B2 Page 1 of 1
DATED : September 21, 2004
INVENTOR(S) : Peter D. Wendt It is certified that error appears in the above-identified patent and that said Letters Patent is hereby corrected as shown below:

Colunm 12,
Line 47, "or an adaptive" should read -- of an adaptive --

Signed and Sealed this

Fifteenth Day of March, 2005

JON W. DUDAS
*Director of the United States Patent and Trademark Office*